United States Patent
Schwartz (10) Patent No.: US 8,165,273 B2
(45) Date of Patent: *Apr. 24, 2012

(54) CUSTOMER PREMISES EQUIPMENT CONFIGURED TO PLACE EMERGENCY CALLS USING DATA NETWORKS

(75) Inventor: Eric Schwartz, Smyrna, GA (US)

(73) Assignee: AT&T Intellectual Property I, L.P.

( * ) Notice: Subject to any disclaimer, the term of this patent is extended or adjusted under 35 U.S.C. 154(b) by 412 days.

This patent is subject to a terminal disclaimer.

(21) Appl. No.: 12/436,461

(22) Filed: May 6, 2009

(65) Prior Publication Data

US 2009/0214001 A1    Aug. 27, 2009

Related U.S. Application Data

(63) Continuation of application No. 11/068,629, filed on Feb. 28, 2005, now Pat. No. 7,545,916.

(51) Int. Cl.
*H04M 11/04*    (2006.01)
(52) U.S. Cl. .............. 379/45; 379/49; 379/46; 370/352
(58) Field of Classification Search ............... 379/45, 379/37–44, 46–49, 265.02, 221.01; 370/352
See application file for complete search history.

(56) References Cited

U.S. PATENT DOCUMENTS

| | | | |
|---|---|---|---|
| 6,427,001 B1 | 7/2002 | Contractor et al. | |
| 6,587,546 B2 | 7/2003 | Stumer et al. | |
| 6,665,611 B1 | 12/2003 | Oran et al. | |
| 6,678,265 B1 | 1/2004 | Kung et al. | |
| 6,678,356 B2 | 1/2004 | Stumer et al. | |
| 6,678,357 B2* | 1/2004 | Stumer et al. | 379/45 |
| 6,850,913 B2* | 2/2005 | Feik | 705/51 |
| 6,882,706 B2 | 4/2005 | Andrew | |
| 7,103,151 B2 | 9/2006 | Lass et al. | |
| 2002/0085538 A1 | 7/2002 | Leung | |
| 2003/0027547 A1* | 2/2003 | Wade | 455/404 |
| 2003/0154276 A1 | 8/2003 | Caveney | |
| 2004/0140928 A1 | 7/2004 | Cleghorn | |
| 2005/0141675 A1* | 6/2005 | Jung | 379/45 |
| 2005/0175166 A1 | 8/2005 | Welenson et al. | |
| 2005/0190892 A1* | 9/2005 | Dawson et al. | 379/37 |
| 2006/0072547 A1* | 4/2006 | Florkey et al. | 370/352 |
| 2006/0072549 A1* | 4/2006 | Goldman et al. | 370/352 |

* cited by examiner

*Primary Examiner* — Melur Ramakrishnaiah
(74) *Attorney, Agent, or Firm* — Myers Bigel Sibley & Sajovec, P.A.

(57) ABSTRACT

Customer premises equipment may include a memory, a modem/router, and a communications device at a customer premises. The memory may be configured to store an address for a public safety answering point corresponding to the customer premises. The modem/router may be configured to provide a data connection between the customer premises equipment at the customer premises and a data network. The communication device may be configured to detect a request for an emergency call being placed from the customer premises equipment, to retrieve the address for the public safety answering point corresponding to the customer premises from the memory responsive to detecting the request for the emergency call, and to establish a voice communication through the modem/router between the customer premises equipment and the public safety answering point corresponding to the customer premises after retrieving the address for the public safety answering point.

19 Claims, 4 Drawing Sheets

CUSTOMER PREMISES EQUIPMENT CONFIGURED TO PLACE EMERGENCY CALLS USING DATA NETWORKS

RELATED APPLICATION

The present application claims the benefit of priority as a continuation of U.S. application Ser. No. 11/068,629 filed Feb. 28, 2005 now U.S. Pat. No. 7,545,916, the disclosure of which is hereby incorporated herein in its entirety by reference.

FIELD OF THE INVENTION

The present invention relates to the field of telephony, and more particularly, to Voice over Internet Protocol (VoIP) and/or other Voice Over Network telephony systems, methods, and computer program products.

BACKGROUND

Telephone calls to 911 are generally routed to a public safety answering point (PSAP). The public safety answering point (PSAP) is a center with 911 operators (or agents) who coordinate emergency services to respond to 911 calls. Generally, when a person places a 911 call, the call is routed through a central office (CO) through a tandem to the public safety answering point (PSAP). An agent at the public safety answering point (PSAP) answers the call and provides whatever assistance is required to handle the emergency.

Many communities provide enhanced 911 (E911) emergency telephone calling services. With E911, emergency operators receive the location of 911 calls as well as the telephone number from which the call originated. Location information is obtained from an Automation Location Information (ALI) database. Telephone subscriber information (e.g., name, address, telephone number) is typically used to build the ALI database. For organizations using a private branch exchange (PBX) telephone switch, however, subscriber information may be limited to the organization's name and its main address. As a result, the "address" displayed to emergency operators who receive a 911 call from inside a PBX can be imprecise or even far away from the caller's actual location. In this case, the operator must obtain location information from the caller defeating a benefit of E911 services. E911 emergency service calls from Voice Over Internet Protocol (VoIP) telephones is discussed, for example, in U.S. Pat. No. 6,665,611, the disclosure of which is hereby incorporated herein in its entirety by reference.

In addition, systems for dialing an emergency telephone number from a teleworking client remotely coupled to a PBX are discussed in U.S. Pat. No. 6,678,356, the disclosure of which is hereby incorporated herein in its entirety by reference. More particularly, systems for dialing an emergency telephone number from a teleworking client detect at a teleworking client when an emergency number is dialed, disconnect the teleworking client from the PBX/MLTS, connect the teleworking client to the public switched telephone network (PSTN), and dial an associated stored number. While discussed with respect to a teleworking client, aspects of the '356 patent may also be applied to other dialup network connections.

SUMMARY

According to embodiments of the present invention, methods of placing an emergency telephone call using customer premises equipment (CPE) at a customer premises may be provided. A data connection between the customer premises equipment (CPE) at the customer premises and a data network may be provided, and a request for an emergency call being placed from the customer premises equipment (CPE) may be detected. Responsive to detecting the request for an emergency call, an address for a public safety answering point corresponding to the customer premises may be retrieved from memory at the customer premises. After retrieving the address for the public safety answering point, a voice communication may be established between the customer premises equipment (CPE) and the public safety answering point corresponding to the customer premises.

The address for the public safety answering point may be a network location and/or designation. For example, the network address for the public safety answering point may be a phone number, an Internet Protocol (IP) address, and/or other similar identifier.

More particularly, the voice communication may be established using the address retrieved from the memory at the customer premises. Moreover, the voice communication may be established over the data connection between the customer premises equipment (CPE) and the data network, for example, using voice over internet protocol (VoIP).

Establishing the voice communication may include attempting to establish the voice communication over the data connection between the customer premises equipment (CPE) and the data network. If the attempt to establish the voice communication over the data connection is unsuccessful, the voice communication may be established over a public switched telephone network line at the customer premises.

In addition, a location of the customer premises may be provided to a public safety answering point directory database before detecting the request for the emergency call. The address for the public safety answering point corresponding to the customer premises may be received at the customer premises equipment (CPE) from the public safety answering point directory database over the data network. The address for the public safety answering point corresponding to the customer premises may then be stored in the memory at the customer premises. For example, user entry of the location of the customer premises may be accepted at the customer premises equipment (CPE) before providing the location of the customer premises. In an alternative, a request for a location of the customer premises may be transmitted over the data network to a network location database before providing the location of the customer premises, and the location of the customer premises may be received at the customer premises equipment (CPE) from the network location database over the data network.

In addition, a request for a non-emergency call being placed from the customer premises equipment (CPE) may be detected, and responsive to detecting the request for the non-emergency call, a voice communication may be established from the customer premises equipment (CPE) over the data network. Moreover, detecting the request for an emergency call may include detecting an emergency code wherein the emergency code and the address for the public safety answering point are different.

According to additional embodiments of the present invention, methods may be provided for identifying a public safety answering point corresponding to a customer premises. In particular, a data connection may be provided between customer premises equipment (CPE) at the customer premises and a data network, and a location of the customer premises may be provided to a public safety answering point directory database. An address for a public safety answering point corresponding to the customer premises may be received at the customer premises equipment (CPE) from the public safety answering point database over the data network. Moreover, the address for the public safety answering point corresponding to the customer premises may be stored in memory at the customer premises.

Before providing the location of the customer premises, user entry of the location of the customer premises may be accepted at the customer premises equipment (CPE), and the location may be provided by transmitting the location over the data network. In addition, providing the location of the customer premises may be initiated responsive to accepting user entry of the location of the customer premises.

Before providing the location of the customer premises, a request for a location of the customer premises may be transmitted over the data network to a network location database, and the location of the customer premises may be received at the customer premises equipment (CPE) from the network location database over the data network. Moreover, a disruption of the data connection followed by providing the data connection may be detected, and the request for the location of the customer premises may be transmitted responsive to the disruption of the data connection followed by providing the data connection.

In addition, a request for an emergency call being placed from the customer premises equipment (CPE) may be detected, and responsive to detecting the request for an emergency call, the address for the public safety answering point corresponding to the customer premises may be retrieved from the memory at the customer premises. After retrieving the address for the public safety answering point, a voice communication may be established between the customer premises equipment (CPE) and the public safety answering point corresponding to the customer premises. The voice communication may be established using the address retrieved from the memory at the customer premises. More particularly, the voice communication may be established over the data connection between the customer premises equipment (CPE) and the data network, for example, using a voice over internet protocol (VoIP). Moreover, detecting the request for an emergency call may include detecting an emergency code wherein the emergency code and the address for the public safety answering point are different.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 1:
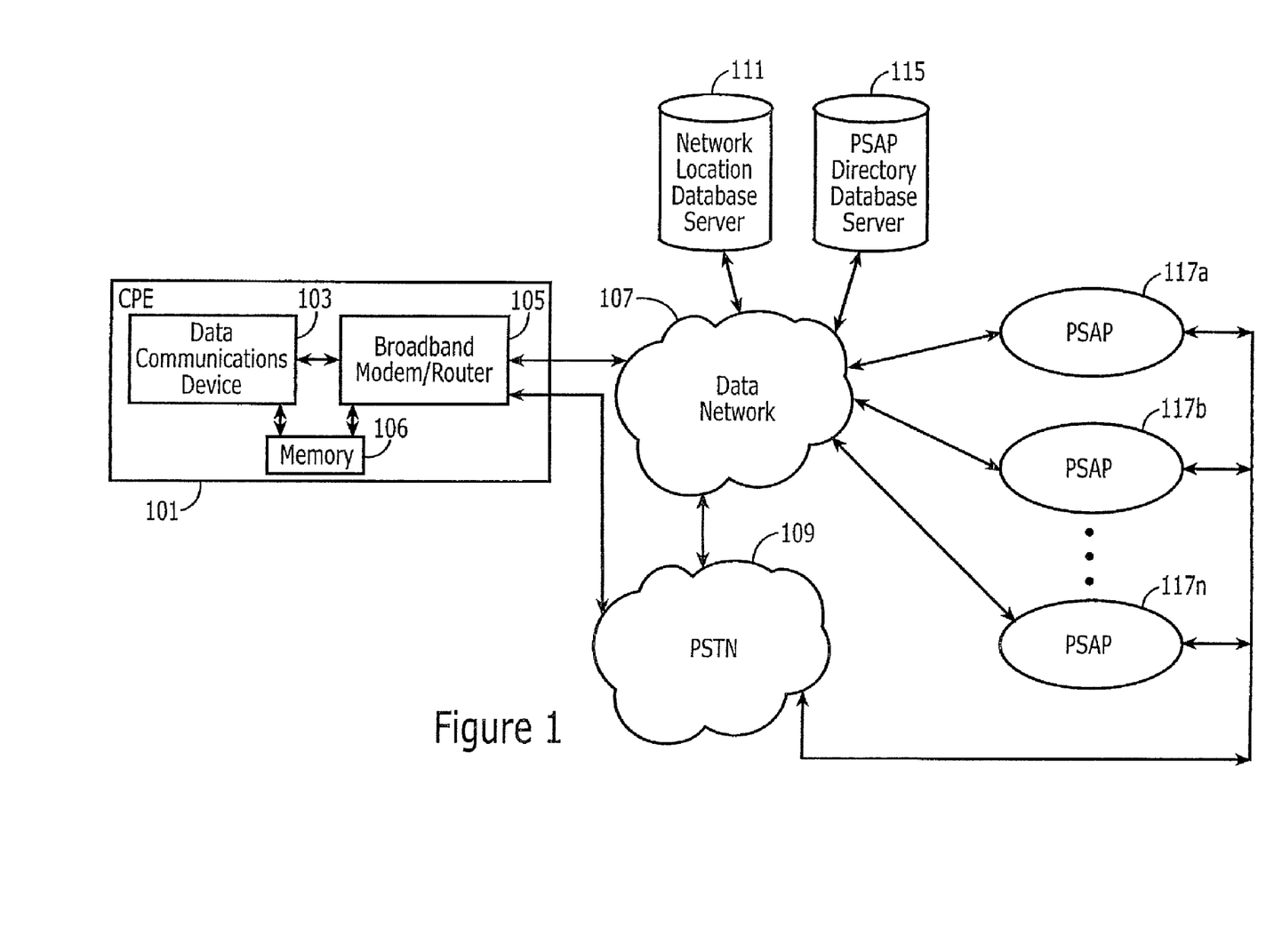
FIG. 1 is a block diagram illustrating methods, systems, and computer program products according to embodiments of the present invention.

FIG. 1 is a block diagram illustrating methods, systems, and computer program products according to embodiments of the present invention. As shown in FIG. 1, customer premises equipment (CPE) 101 may include a data communications device 103 (such as a VoIP telephone, a conventional telephone coupled to a VoIP adapter, a WiFi telephone wirelessly coupled to a WiFi access point, a computer providing telephony functionality, etc.) and a broadband modem/router 105. While the data communications device 103 and the broadband modem/router 105 are illustrated as separate blocks, functionality of the two may be implemented in a single device, or functionality of the two may be provided in three or more separate devices. Moreover, a division of functionality between two or more blocks of customer premises equipment (CPE) may be varied according to a particular implementation.

As used herein, the term customer premises refers to a location wherein customer premises equipment (CPE) 101 is located and from which a user places a telephone call using customer premises equipment (CPE). A customer premises may be a house, an apartment, an office, or any other location which can be sufficiently identified by an address (such as a physical address or street address) used to determine a public safety answering point PSAP having jurisdiction over the customer premises. The customer premises, for example, may be identified by a street address that can be used to identify a particular public safety answering point (PSAP) having jurisdiction over the customer premises. Moreover, a broadband modem/router may not be required, and/or the broadband modem/router 105 may be provided remote from the customer premises. Accordingly, the customer premises equipment (CPE) 101 need not include all functionality illustrated in FIG. 1.

As further shown in FIG. 1, the customer premises equipment (CPE) 101 may be coupled to a data network 107 (such as the Internet) that is remote from the customer premises. The customer premises equipment (CPE) 101 can thus provide Voice over Internet Protocol (VoIP) telephone communications with conventional telephones or other Voice over Internet Protocol (VoIP) devices over the data network 107 and the Public Switched Telephone Network 109. In addition or in an alternative, the customer premises equipment (CPE) 101 can provide voice communications with other Voice over Internet Protocol (VoIP) devices through data network 107 without using the public switched telephone network (PSTN) 109.

The customer premises equipment (CPE) 101 can thus be used to provide Voice over Internet Protocol (VoIP) telephone communications from a customer premises across the remote data network 107. In a residential application, for example, the customer premises equipment (CPE) 101 may be located at a residence with the broadband modem/router 105 providing functionality of a cable modem to provide coupling to the data network 107 (such as the Internet) over a television cable or providing functionality of a DSL modem to provide coupling to the data network 107 over a telephone line. In still other alternatives, the broadband modem/router 105 may provide coupling to the data network over other mediums such as a power transmission line and/or a wireless link.

In a business application, the customer premises equipment (CPE) may be located in an office, and the data network 107 may include a private branch exchange and/or local area network (LAN) providing telephone service for a plurality of offices in a business or other organization. In a business application, the data communications device 103 may be directly coupled to the data network so that a broadband modem/router 105 at the customer premises is not required. In other applications, the customer premises equipment (CPE) 101 may be coupled to the Internet though a PBX, or the customer premises equipment (CPE) 101 may be coupled to a PBX through the Internet (such as in a telecommuting application).

Because the customer premises equipment (CPE) 101 may provide Voice over Internet Protocol (VoIP) telephone communications from any location where a network connection is provided, a location of the customer premises equipment (CPE) 101 may be uncertain and/or may change. A network location database server 111 may thus be coupled to the data network 107 to determine a location of the customer premises equipment (CPE) 101. The location of the customer premises equipment (CPE) 101 can then be provided to the public safety answering point (PSAP) directory database server 115 to determine which of a plurality of public safety answering points (PSAPs) 117a-n has jurisdiction over the current location of the customer premises equipment (CPE) 101. By providing the customer premises equipment (CPE) 101 with an address (e.g. a routing address, an Internet Protocol address, a telephone number, etc.) for the appropriate public safety answering point (PSAP) 117, an emergency 911 call can be placed from the customer premises equipment (CPE) over the data network 107 using the address to obtain emergency assistance in a timely manner.

According to embodiments of the present invention, an emergency telephone call can be placed from the data communications device 103 at a customer premises to an appropriate public safety answering point (PSAP) having jurisdiction over the customer premises. First, the customer premises equipment (CPE) 101 may obtain a current location such as an address of the current customer premises. The current location of the customer premises equipment (CPE) 101 may be obtained, for example, by accepting user entry of the current location (e.g. street address) at the data communications device 103, for example, using a browser page or other mechanism. Moreover, the data communications device 103 may prompt for user input of the current location upon detecting that a connection to the data network has been interrupted and reestablished. Accordingly, the network location database server 111 may not be required.

In alternative embodiments of the present invention, a current location of the customer premises equipment (CPE) 101 may be obtained by transmitting a request for the current location over the data network 107 to the network location database server 111. Based on prior knowledge of the network layout, the network location database server 111 may be able to determine a physical location (e.g. a street address) for the customer premises equipment (CPE) 101 transmitting the request. The data network 101, for example, may be a corporate network, and the network location database server 111 may be able to determine a physical location based on a port to which the customer premises equipment (CPE) 101 is connected. In other embodiments, the network location database server 111 may be able to determine a location of the customer premises equipment (CPE) based on a physical and/or virtual line (e.g. a DSL line or a cable modem coupling) over which the customer premises equipment (CPE) is connected. Moreover, the request for the current location may be initiated responsive to detecting interruption of the data network connection followed by reconnection to the data network.

The network location database server 111 can thus determine a physical location (e.g. a street address) at which the customer premises equipment (CPE) 101 is located, and the physical location can be transmitted to the customer premises equipment (CPE) 101. Upon receipt of its physical location, the customer premises equipment (CPE) 101 can store the physical location in memory 106. For example, the physical location may be stored in memory located in the data communications device 103 and/or in the broadband modem/receiver 105. When placing an emergency call, information identifying the physical location of the customer premises equipment (CPE) 101 can be transmitted with the emergency call (either in-band or out-of-band) based on the location information stored in memory. Depending on the technical capabilities of the particular public safety answering point (PSAP), the receiving public safety answering point (PSAP) can thus determine the location from which the emergency call is being placed.

A location of the customer premises may thus be provided to the public safety answering point directory database server 115. According to particular embodiments, the location of the customer premises may be transmitted from the customer premises equipment (CPE) 101 over the data network 107 to the public safety answering point (PSAP) directory database server 115. According to alternate embodiments, the network location database server 111 and the public safety answering point (PSAP) directory database server 115 may communicate directly so that: the customer premises equipment (CPE) 101 transmits a request to the network location server database 111; and the network location database server database server 111 determines a location of the customer premises equipment (CPE) 101 and transmits the location to the public safety answering point (PSAP) directory database server 115. According to still other embodiments, the network location database server 111 and the public safety answering point (PSAP) directory database server 115 may be implemented together.

By providing the public safety answering point (PSAP) directory database 115 with the location of the customer premises equipment (CPE) 101, the public safety answering point (PSAP) directory database can determine a public safety answering point (PSAP) address (e.g. a routing address, a telephone number, Internet Protocol address, etc.) used to route an emergency call from the customer premises equipment (CPE) 101 to a particular public safety answering point (PSAP) 117 corresponding to (e.g. having jurisdiction over) the customer premises. The address for the public safety answering point (PSAP) corresponding to the customer premises can then be sent from the public safety answering point (PSAP) directory database server 115 to the customer premises equipment (CPE) 101 over the data network 107, and stored in memory 106 at customer premises equipment (CPE) 101. For example, the address for the public safety answering point (PSAP) corresponding to the customer premises may be stored in persistent memory (e.g. nonvolatile memory) at the broadband modem/router 105 and/or the data communications device 103.

Moreover, the PSAP directory database may provide a primary PSAP address for a primary PSAP corresponding to the location of the customer premises, and any number of secondary PSAP addresses for secondary PSAPs corresponding to the location of the customer premises. For example, a primary PSAP may be a PSAP for a municipality in which the customer premises is located, and a secondary PSAP may be a PSAP for a county in which the customer premises is located. By storing primary and secondary PSAP addresses in memory 106 of the CPE 101, the CPE can first attempt to place an emergency call to the primary PSAP. If the call cannot be completed to the primary PSAP, the CPE can then automatically attempt to place the emergency call to the secondary PSAP without requiring additional input from the user.

In FIG. 1, the memory 106 is shown as a component apart from the data communications device 103 and the broadband modem/router 105 with couplings to both the data communications device 103 and the broadband modem/router 105. In alternative embodiments, the memory 106 may be separate from the data communications device 103 and the broadband modem/router 105 with a coupling to one or the other of the data communications device 103 or the broadband modem/router 105. In other alternative embodiments, the memory 106 (or portions thereof) may be incorporated in the data communications device 103 and/or the broadband modem/router 105. Moreover, the memory 106 may include electronic memory (such as an integrated circuit memory device), magnetic memory (such as a magnetic tape memory or a magnetic disk memory), optical memory (such as an optical disk memory, a compact disk memory, or a digital video disk memory), etc.

By providing the address for the public safety answering point (PSAP) having jurisdiction at the customer premises in memory 106 at the customer premises equipment (CPE) 101, an emergency 911 telephone call can be placed from the customer premises equipment (CPE) 101 to the correct public safety answering point (PSAP) even though the customer premises equipment (CPE) may be located remotely with respect to the data network 107. Moreover, the public safety answering point (PSAP) address may be updated at the customer premises equipment (CPE) 101 as appropriate. For example, the customer premises equipment (CPE) 101 may automatically initiate a public safety answering point (PSAP) address update any time a connection to the data network 107 is interrupted and reestablished. Interruption and reestablishment of a connection to the data network 107 would likely occur when the customer premises equipment (CPE) 101 is moved from one location to another.

As discussed above, a data connection may be provided between the customer premises equipment (CPE) 101 and the data network 107, and the data connection may support Voice over IP (VoIP) telephone communications as well as other data communications. Moreover, the customer premises equipment (CPE) 101 (including the data communications device 103 and/or the broadband modem/router 105) may be configured to detect whether a call being placed from the customer premises equipment (CPE) 101 is a normal (non-emergency) telephone communication or an emergency communication (such as an emergency 911 call). For example, a telephone number being called may be compared at the customer premises equipment (CPE) 101 to a known emergency code(s) (such as 911), and a match between the telephone number being called and the known emergency code(s) may indicate a emergency call.

Upon detecting a request for an emergency call being placed from the customer premises equipment (CPE) 101, the address for the public safety answering point (PSAP) corresponding to the customer premises may be retrieved from memory 106 of the customer premises equipment (CPE) 101. After retrieving the address for the public safety answering point, a voice communication may be established between the data communications device and the public safety answering point corresponding to the customer premises. More particularly, the voice communication with the public safety answering point (PSAP) may be established using the address retrieved from memory 106 at customer premises equipment (CPE) 101. Moreover, the voice communication may be established over the data connection between the customer premises equipment (CPE) 101 and the data network 107 using Voice over Internet Protocol (VoIP).

According to particular embodiments, establishing the voice communication may include attempting to establish the voice communication over the data connection between the data communications device and the data network. If successful, the emergency call may be conducted over the data network 107, for example, using Voice over Internet Protocol (VoIP). As discussed above, addresses for primary and secondary PSAPs may be stored in memory 106 of CPE 101. Accordingly, establishing the voice communication may include attempting to establish the voice communication over the data connection first using the address for the primary PSAP. If the voice communication cannot be established using the address for the primary PSAP, the CPE 101 may attempt to establish voice communications over the data connection using an address for a secondary PSAP.

If the emergency call cannot be established over the data network 107, however, the customer premises equipment (CPE) 101 may establish the voice communication over the a public switched telephone network line directly coupling the customer premises equipment (CPE) 101 with the public switched telephone network (PSTN) 109, for example, using dual tone multi-frequency (DTMF) signaling. The public switched telephone network (PSTN) may thus provide a backup (or failsafe) in the event that an emergency call cannot be completed using the data network 107. In addition, the CPE 101 may have sufficiently detailed address information stored in memory to allow direct placement of a call to the relevant PSAP without relying on the PSTN to route the call using conventional "911" routing. For example, the CPE 101 memory 106 may store a 10 digit PSTN telephone number for the relevant PSAP.

Upon establishing the communication over the public switched telephone network (PSTN), the CPE 101 may provide a call back number to the PSAP in the event that the PSAP should need to call the CPE (for example, if the initial communication is terminated). The CPE 101, for example, may provide its Voice over IP telephone number, or the CPE 101 may provide the PSTN telephone number for the PSTN line over which the call is placed.

Physically separate lines coupling the customer premises equipment (CPE) 101 to the data network 107 and to the public switched telephone network (PSTN) 109 may not be required if a digital subscriber line (DSL) modem is used as the broadband modem/router 105 to provide access to the data network 107 over a telephone line. In an alternative, couplings between the customer premises equipment (CPE) 101 and the data network 107 and between the customer premises equipment (CPE) 101 and the public switched telephone network (PSTN) 109 may be provided over separate lines, such as when the coupling to the data network 107 is provided using a cable modem and a television cable.

As discussed above, the customer premises equipment (CPE) 101 may support emergency calls (such as emergency 911 calls) over a data network 107. The customer premises equipment (CPE) 101 may also support non-emergency telephone calls to other telephones coupled to the data network 107 and/or the public switched telephone network (PSTN) 109. As discussed above, a telephone number being called may be compared at the customer premises equipment (CPE) 101 to a known emergency code(s) (such as 911), and a match between the telephone number being called and the known emergency code(s) may indicate an emergency call. No match between the telephone number being called and the known emergency code(s) may indicate a request for a non-emergency call. Upon detecting a request for a non-emergency call being placed from the data communications device, a voice communication may be established from the data communications device over the data network, for example, using Voice over Internet Protocol (VoIP).

One or more Voice over Internet Protocol (VoIP) gateways may be provided as an interface between the data network 107 and the public switched telephone network (PSTN) 109. A Voice over Internet Protocol (VoIP) gateway may be implemented as a part of the data network 107, as a part of the public switched telephone network (PSTN) 109, and/or as an independent component, and/or portions of a Voice over Internet Protocol (VoIP) gateway may be split between the data network 107 and/or the public switched telephone network (PSTN) 109. Moreover, one or more Voice over Internet Protocol (VoIP) applications may be provided to manage and control calls moving across the data network 107 to the public safety answering points (PSAPs) 117*a-n*. Such a Voice over Internet Protocol (VoIP) application may include one or more Voice over Internet Protocol (VoIP) gateways, soft switches, and/or application servers. Moreover, the Voice over Internet Protocol (VoIP) application(s) may provide call control and management directly from the data network 107 to the public safety answering points (PSAPs) 117*a-n*, or the Voice over Internet Protocol (VoIP) applications(s) may provide call control and management to the public safety answering point (PSAP)s 117*a-n* through the public switched telephone network (PSTN) 109.

Figure 2:
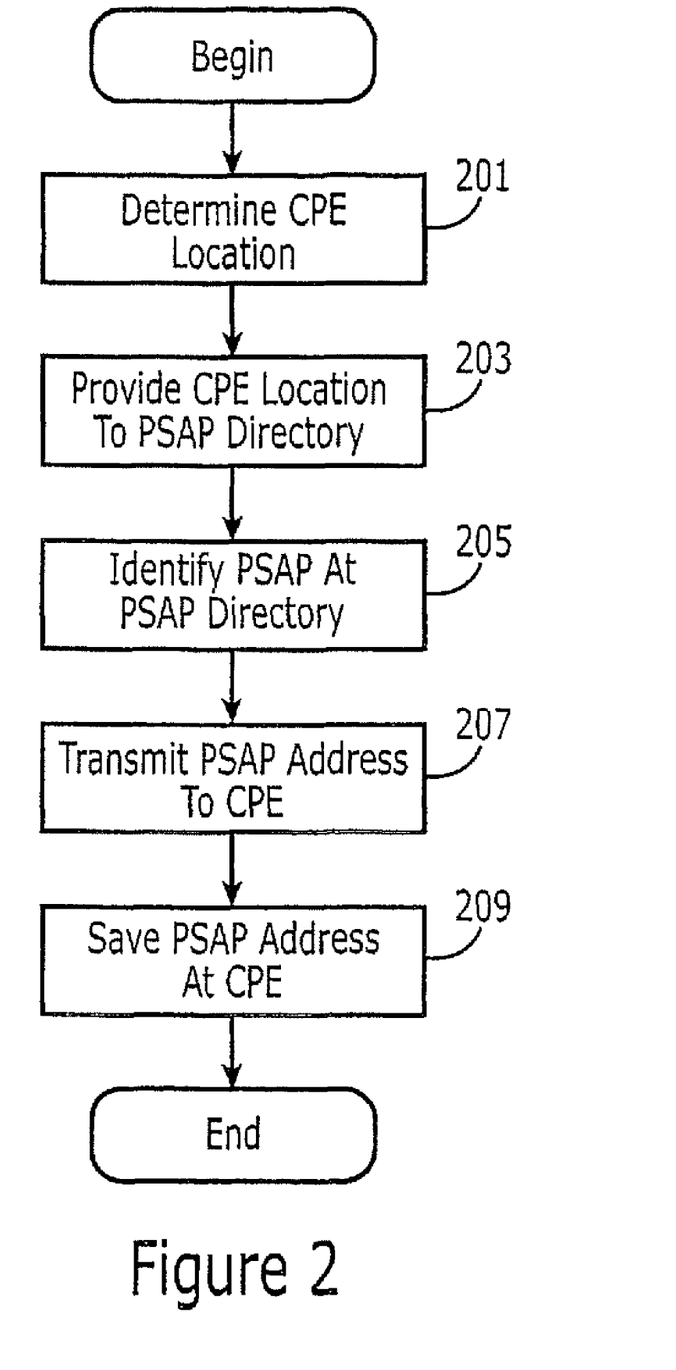
FIGS. 2-4 are flow charts illustrating methods, systems, and computer program products according to embodiments of the present invention.

Operations of identifying a public safety answering point corresponding to a customer premises according to embodiments of the present invention are illustrated in the flow chart of FIG. 2. At block 201, a location of the customer premises equipment (CPE) is determined. For example, the customer premises equipment (CPE) may accept user entry of the location (such as a street address) of the customer premises at the customer premises equipment (CPE). In an alternative, the customer premises equipment (CPE) may transmit a request for the location of the customer premises over a data network to a network location database server, and the network location database server may respond by transmitting the location (such as the street address) of the customer premises to the customer premises equipment (CPE). In another alternative, the customer premises equipment (CPE) may determine its location using a satellite global position system (GPS) or other positioning system (such as LORAN).

At block 203, the location (such as the street address) of the customer premises may be provided to a public safety answering point directory database. For example, the customer premises network may transmit the location (such as the street address) of the customer premises to the public safety answering point directory database. At block 205, the public safety answering point directory database identifies the public service answering point having jurisdiction over the customer premises, and at block 207, the public service answering point directory data base transmits to the customer premises equipment (CPE) the address (e.g. a routing address, a telephone number, an Internet Protocol address, etc.) for the public service answering point having jurisdiction over the customer premises. In an alternative, functionality of a network location database server may be provided at the public safety answering point directory database so that a single request (without providing a location of the customer premises) from the customer premises equipment (CPE) over the data network may trigger the public safety answering point directory database to transmit the address for the appropriate public safety answering point.

At block 209, the customer premises equipment (CPE) receives the public safety answering point (PSAP) address transmitted by the public safety answering point (PSAP) directory database server, and saves the public safety answering point (PSAP) address in memory of the customer premises equipment (CPE). Accordingly, the public safety answering point (PSAP) address can be maintained at the customer premises equipment (CPE) for use when placing emergency 911 calls. At blocks 207 and 209, multiple public safety answering point (PSAP) addresses may be transmitted to the customer premises equipment (CPE) and saved in memory of the customer premises equipment (CPE). Secondary routings to primary and/or secondary public safety answering point(s) (PSAP) may thus be available to the customer premises equipment (CPE) in the event that an emergency call cannot be established using the primary routing.

In addition, the public safety answering point (PSAP) directory database server may log the location of the customer premises equipment (CPE) when the public safety answering point (PSAP) address is transmitted to the customer premises equipment (CPE). When an emergency call is subsequently placed from the customer premises equipment (CPE) to the public safety answering point (PSAP), the public safety answering point (PSAP) can determine a current location of the customer premises equipment (CPE) using the log at the public safety answering point (PSAP) directory database server. In an alternative, a location of the customer premises equipment (CPE) may be provided to the public safety answering point (PSAP) by the customer premises equipment (CPE) when the emergency call is placed.

Figure 3:
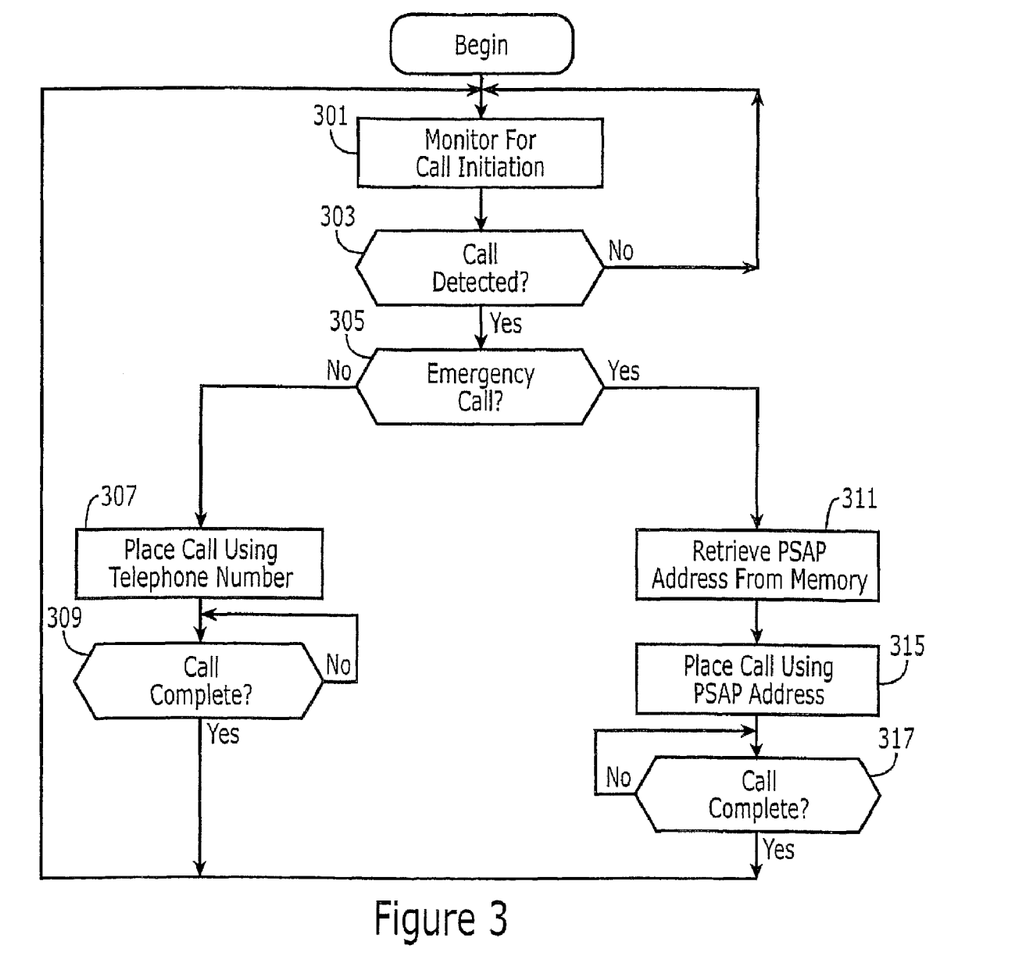

FIG. 3 is a flow chart illustrating operations of placing an emergency call according to embodiments of the present invention. The customer premises equipment (CPE) may monitor for call initiation at block 301, and upon detecting call initiation at block 303, the customer premises equipment (CPE) may determine if the call is an emergency call at block 305. Call initiation may be detected at block 303, for example, by detecting user entry of a telephone number at the customer premises equipment (CPE). The entered telephone number can then be compared to one or more known emergency codes (such as 911), and if the telephone number matches a known emergency code, the determination at block 305 may be that the call is an emergency call. If the entered telephone number does not match a known emergency code, the determination at block 305 may be that the call is a non-emergency call.

If the call is determined to be a non-emergency call at block 305, a non-emergency network call may be established at block 307. More particularly, a call may be established over the data network using the telephone number entered by the user at the customer premises equipment (CPE). Once the call is complete at block 309, the customer premises equipment (CPE) may again monitor for call initiation at blocks 301 and 303.

If the call is determined to be an emergency call at block 305, the public safety answering point (PSAP) address may be retrieved from memory of the customer premises equipment (CPE) at block 311, and an emergency call may be placed to the appropriate public safety answering point (PSAP) using the public safety answering point (PSAP) address from memory at the customer premises equipment (CPE) at block 315. More particularly, the public safety answering point (PSAP) address from memory and the emergency code may be different. Upon completion of the emergency call at block 317, the customer premises equipment (CPE) may again monitor for call initiation at blocks 301 and 303.

Figure 4:
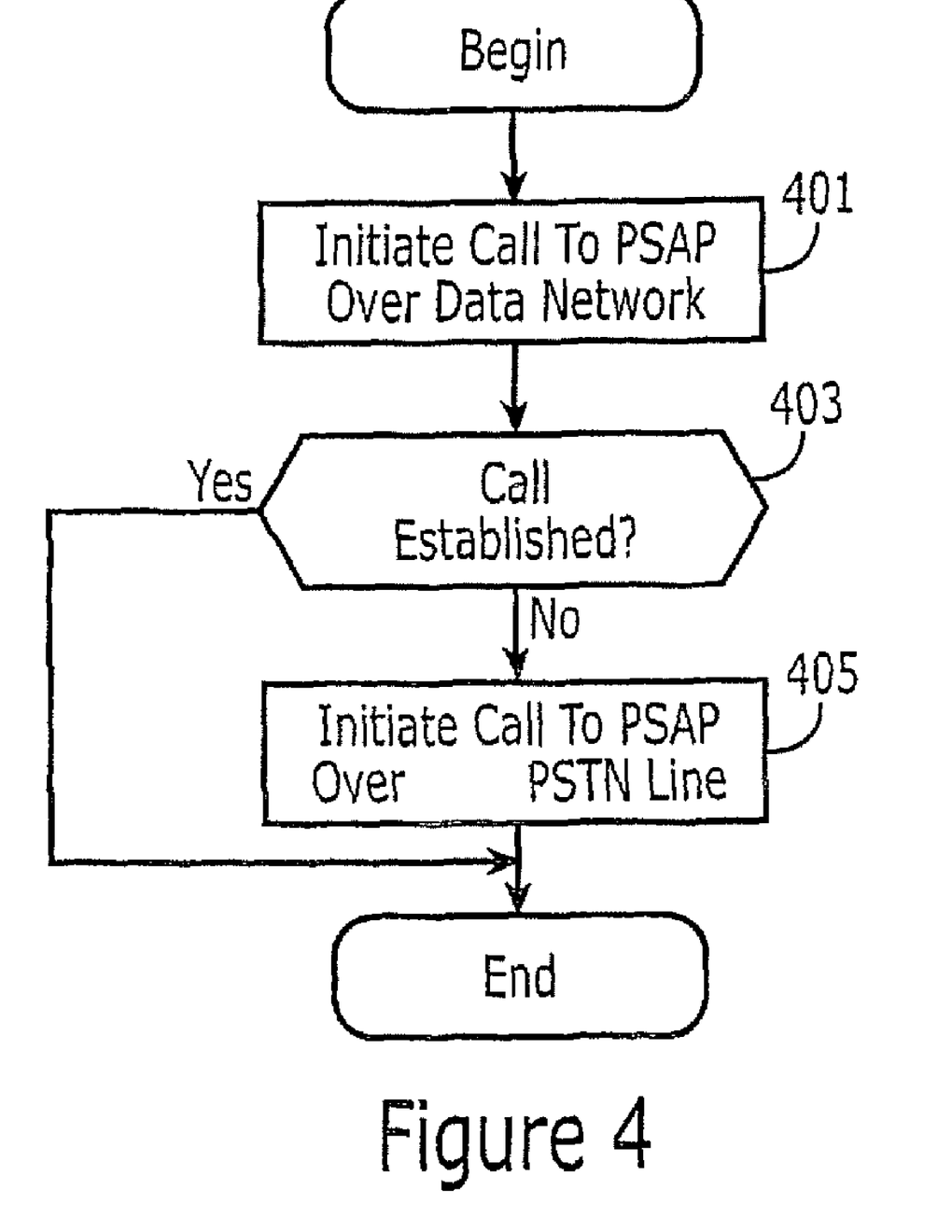

FIG. 4 is a flow chart illustrating operations of placing an emergency call (as discussed above, for example, with respect to block 315 of FIG. 3). In particular, the customer premises equipment (CPE) may attempt to initiate a call to the public safety answering point (PSAP) over the data network using the public safety answering point (PSAP) address from customer premises equipment (CPE) memory at block 401. If the emergency call to the public safety answering point (PSAP) is established over the data network at block 403, the call may proceed as discussed above with respect to FIG. 3 using Voice over Internet Protocol (VoIP).

If the emergency call to the public safety answering point (PSAP) cannot be established over the data network at block 403, the customer premises equipment (CPE) may attempt to initiate the emergency call to the public safety answering point (PSAP) over a public switched telephone network (PSTN) telephone line at block 405. A public switched telephone network (PSTN) telephone line may be provided at the customer premises, and the customer premises equipment (CPE) may use the public switched telephone network (PSTN) telephone line as a backup or failsafe in the event that an emergency call cannot be placed over the data network.

As discussed above with respect to FIG. 4, a public switched telephone network (PSTN) telephone line may be used as a backup to place an emergency call in the event that the emergency call cannot be placed over the data network. A public switched telephone network (PSTN) telephone number for the appropriate public safety answering point (PSAP) may be provided to the customer premises equipment (CPE) by the public safety answering point (PSAP) directory database server at the same time that the address for access to the public safety answering point (PSAP) over the data network is provided. Moreover, the public switched telephone network (PSTN) telephone number for the appropriate public safety answering point (PSAP) may be stored in memory at the customer premises equipment (CPE). In addition, multiple data network addresses and/or telephone numbers for the appropriate public safety answering point (PSAP) may be provided to the customer premises equipment (CPE) and stored in memory to provide a plurality of backup call routings over the data network and/or over the public switched telephone network (PSTN).

Many variations and modifications can be made to the embodiments described herein without substantially departing from the principles of the present invention. All such variations and modifications are intended to be included herein within the scope of the present invention, as set forth in the following claims.

That which is claimed is:

1. Customer premises equipment at a customer premises, the customer premises equipment comprising:

a memory at the customer premises, wherein the memory is configured to store an address for a public safety answering point corresponding to the customer premises;

a modem at the customer premises wherein the modem is configured to provide a data connection between the customer premises equipment at the customer premises and a data network;

a communication device at the customer premises and coupled to the modem, wherein the communications device is configured to detect a request for an emergency call being placed from the customer premises equipment, to retrieve the address for the public safety answering point corresponding to the customer premises from the memory responsive to detecting the request for the emergency call, and to establish a voice communication through the modem between the customer premises equipment and the public safety answering point corresponding to the customer premises after retrieving the address for the public safety answering point;

wherein the communications device is further configured to provide a location of the customer premises to a public safety answering point directory database before detecting the request for the emergency call, to receive the address for the public safety answering point corresponding to the customer premises at the customer premises equipment from the public safety answering point directory database over the data network, and to store the address for the public safety answering point corresponding to the customer premises in the memory at the customer premises.

2. Customer premises equipment according to claim 1 wherein the communication device is configured to establish the voice communication by establishing the voice communication using the address retrieved from the memory at the customer premises.

3. Customer premises equipment according to claim 2 wherein establishing the voice communication comprises establishing the voice communication over the data connection between the customer premises equipment and the data network.

4. Customer premises equipment according to claim 2 wherein the voice communication between the customer premises equipment and the public safety answering point is established using a voice over internet protocol.

5. Customer premises equipment according to claim 1 wherein the communication device is configured to establish the voice communication by,
   attempting to establish the voice communication over the data connection between the customer premises equipment and the data network, and
   after attempting to establish the voice communication over the data connection, establishing the voice communication over a public switched telephone network line at the customer premises.

6. Customer premises equipment according to claim 1 wherein the communications device is further configured to accept user entry of the location of the customer premises at the customer premises equipment before providing the location of the customer premises.

7. Customer premises equipment according to claim 1 wherein the communications device is further configured to transmit a request for a location of the customer premises over the data network to a network location database before providing the location of the customer premises, and to receive the location of the customer premises at the customer premises equipment from the network location database over the data network.

8. Customer premises equipment according to claim 1 wherein the communications device is further configured to detect a request for a non-emergency call being placed from the customer premises equipment, and to establish a voice communication through the modem from the customer premises equipment over the data network responsive to detecting the request for the non-emergency call.

9. Customer premises equipment according to claim 1 wherein the communications device is configured to detect the request for an emergency call by detecting an emergency code wherein the emergency code and the address for the public safety answering point are different.

10. Customer premises equipment at a customer premises, the customer premises equipment comprising:
    a modem configured to provide a data connection between the customer premises equipment at the customer premises and a data network;
    a communications device configured to provide a location of the customer premises to a public safety answering point directory database through the modem, to receive an address for a public safety answering point corresponding to the customer premises at the customer premises equipment from the public safety answering point database over the data network through the modem, and to store the address for the public safety answering point corresponding to the customer premises in memory at the customer premises.

11. Customer premises equipment according to claim 10 wherein the communications device is further configured to accept user entry of the location of the customer premises at the customer premises equipment before providing the location of the customer premises wherein providing the location comprises transmitting the location over the data network.

12. Customer premises equipment according to claim 11 wherein providing the location of the customer premises is initiated responsive to accepting user entry of the location of the customer premises.

13. Customer premises equipment according to claim 10 wherein the communications device is further configured to transmit a request for a location of the customer premises over the data network to a network location database before providing the location of the customer premises, and to receive the location of the customer premises at the customer premises equipment from the network location database over the data network.

14. Customer premises equipment according to claim 13 wherein the communications device is further configured to detect a disruption of the data connection followed by providing the data connection, wherein the request for the location of the customer premises is transmitted responsive to the disruption of the data connection followed by providing the data connection.

15. Customer premises equipment according to claim 10 wherein the communications device is further configured to detect a request for an emergency call being placed from the customer premises equipment, to retrieve the address for the public safety answering point corresponding to the customer premises from the memory at the customer premises responsive to detecting the request for the emergency call, and to establish a voice communication between the customer premises equipment and the public safety answering point corresponding to the customer premises using the address retrieved from the memory at the customer premises after retrieving the address for the public safety answering point.

16. Customer premises equipment according to claim 15 wherein the communication device is configured to establish the voice communication by establishing the voice communication over the data connection between the customer premises equipment and the data network.

17. Customer premises equipment according to claim 16 wherein the voice communication between the customer premises equipment and the public safety answering point is established using a voice over internet protocol.

18. Customer premises equipment according to claim 16 wherein the communication device is configured to detect the request for an emergency call by detecting an emergency code wherein the emergency code and the address for the public safety answering point are different.

19. Customer premises equipment according to claim 10 wherein the communication device is configured to provide the location by providing a street address of the customer premises from the customer premises equipment to the public safety answering point directory database.

* * * * *

UNITED STATES PATENT AND TRADEMARK OFFICE
CERTIFICATE OF CORRECTION

| | | |
|---|---|---|
| PATENT NO. | : 8,165,273 B2 | Page 1 of 1 |
| APPLICATION NO. | : 12/436461 | |
| DATED | : April 24, 2012 | |
| INVENTOR(S) | : Schwartz | |

It is certified that error appears in the above-identified patent and that said Letters Patent is hereby corrected as shown below:

<u>In the Claims:</u>
Column 15, Claim 17, Line 6: Please correct "claim 16" to read -- claim 15 --
Claim 18, Line 10: Please correct "claim 16" to read -- claim 15 --

Signed and Sealed this
Fourteenth Day of August, 2012

David J. Kappos
*Director of the United States Patent and Trademark Office*